United States Patent
Wilz, Sr.

(10) Patent No.: US 8,740,082 B2
(45) Date of Patent: Jun. 3, 2014

(54) LASER SCANNING BAR CODE SYMBOL READING SYSTEM HAVING INTELLIGENT SCAN SWEEP ANGLE ADJUSTMENT CAPABILITIES OVER THE WORKING RANGE OF THE SYSTEM FOR OPTIMIZED BAR CODE SYMBOL READING PERFORMANCE

(75) Inventor: David M. Wilz, Sr., Sewell, NJ (US)

(73) Assignee: Metrologic Instruments, Inc., Blackwood, NJ (US)

( * ) Notice: Subject to any disclaimer, the term of this patent is extended or adjusted under 35 U.S.C. 154(b) by 0 days.

(21) Appl. No.: 13/400,748

(22) Filed: Feb. 21, 2012

(65) Prior Publication Data

US 2013/0214048 A1    Aug. 22, 2013

(51) Int. Cl.
*G06K 7/00*    (2006.01)

(52) U.S. Cl.
USPC ............... 235/462.16; 235/462.01; 235/462.1

(58) Field of Classification Search
None
See application file for complete search history.

(56) References Cited

U.S. PATENT DOCUMENTS

| | | |
|---|---|---|
| 4,560,862 A | 12/1985 | Eastman et al. |
| 4,603,262 A | 7/1986 | Eastman et al. |
| 4,639,606 A | 1/1987 | Boles et al. |
| 4,820,911 A | 4/1989 | Arackellian et al. |
| 5,115,121 A * | 5/1992 | Bianco et al. ............ 235/462.25 |
| 5,235,167 A * | 8/1993 | Dvorkis et al. .......... 235/462.21 |
| 5,250,791 A | 10/1993 | Heiman et al. |
| 5,260,553 A | 11/1993 | Rockstein et al. |
| 5,340,971 A | 8/1994 | Rockstein et al. |
| 5,340,973 A | 8/1994 | Knowles et al. |
| 5,424,525 A | 6/1995 | Rockstein et al. |
| 5,440,111 A | 8/1995 | Eastman et al. |
| 5,468,951 A | 11/1995 | Knowles et al. |
| 5,484,992 A | 1/1996 | Wilz et al. |
| 5,525,789 A | 6/1996 | Rockstein et al. |
| 5,528,024 A | 6/1996 | Rockstein et al. |
| 5,591,953 A | 1/1997 | Rockstein et al. |
| 5,616,908 A | 4/1997 | Wilz et al. |
| 5,627,359 A | 5/1997 | Amundsen et al. |
| 5,661,292 A | 8/1997 | Knowles et al. |
| 5,742,043 A | 4/1998 | Knowles et al. |
| 5,756,982 A | 5/1998 | Knowles et al. |
| 5,767,501 A | 6/1998 | Schmidt et al. |
| 5,789,730 A | 8/1998 | Rockstein et al. |
| 5,789,731 A | 8/1998 | Amundsen et al. |
| 5,796,091 A | 8/1998 | Schmidt et al. |
| 5,825,012 A | 10/1998 | Rockstein et al. |
| 5,828,048 A | 10/1998 | Rockstein et al. |
| 5,844,227 A | 12/1998 | Schmidt et al. |
| 5,844,229 A | 12/1998 | Rockstein et al. |
| 5,874,721 A | 2/1999 | Knowles et al. |
| 5,883,375 A | 3/1999 | Knowles et al. |
| 5,886,337 A | 3/1999 | Rockstein et al. |
| 5,895,907 A | 4/1999 | Rockstein et al. |

(Continued)

*Primary Examiner* — Matthew Mikels
(74) *Attorney, Agent, or Firm* — Additon, Higgins, Pendleton & Ashe, P.A.

(57) ABSTRACT

Method of and system for reading bar code symbols a laser scanning bar code symbol reading system having the capacity to intelligently control the scan sweep angle of a laser scanning beam in a user-transparent and intuitive manner. In the event that two or more bar code symbol indications are represented in a buffered line of scan data, then the scan sweep angle of the laser scanning beam is automatically reduced so that the resulting laser scanning beam will be shortened and only a single bar code symbol will be scanned, most likely with the center portion of the laser scanning beam.

20 Claims, 8 Drawing Sheets

(56) References Cited

U.S. PATENT DOCUMENTS

| | | |
|---|---|---|
| 5,925,870 A | 7/1999 | Wilz et al. |
| 5,925,871 A | 7/1999 | Knowles et al. |
| 6,085,981 A | 7/2000 | Knowles et al. |
| 6,182,898 B1 | 2/2001 | Schmidt et al. |
| 6,189,793 B1 | 2/2001 | Knowles et al. |
| 6,209,789 B1 | 4/2001 | Amundsen et al. |
| 6,223,987 B1 | 5/2001 | Knowles et al. |
| 6,283,375 B1 | 9/2001 | Wilz et al. |
| 6,412,700 B1 | 7/2002 | Blake et al. |
| 6,427,917 B2 | 8/2002 | Knowles et al. |
| 6,457,642 B1 | 10/2002 | Good et al. |
| 6,499,664 B2 | 12/2002 | Knowles et al. |
| 6,772,949 B2 | 8/2004 | Wilz et al. |
| 6,857,572 B2 | 2/2005 | Martin et al. |
| 6,860,427 B1 | 3/2005 | Schmidt et al. |
| 6,905,071 B2 | 6/2005 | Schmidt et al. |
| 6,945,463 B2 | 9/2005 | Rockstein et al. |
| 7,007,849 B2 | 3/2006 | Schmidt et al. |
| 7,278,578 B2 | 10/2007 | Schmidt et al. |
| 7,325,740 B2 | 2/2008 | Schmidt et al. |
| 2009/0057409 A1* | 3/2009 | Feinstein et al. ......... 235/462.02 |
| 2010/0308115 A1* | 12/2010 | Liou ...................... 235/462.22 |

* cited by examiner

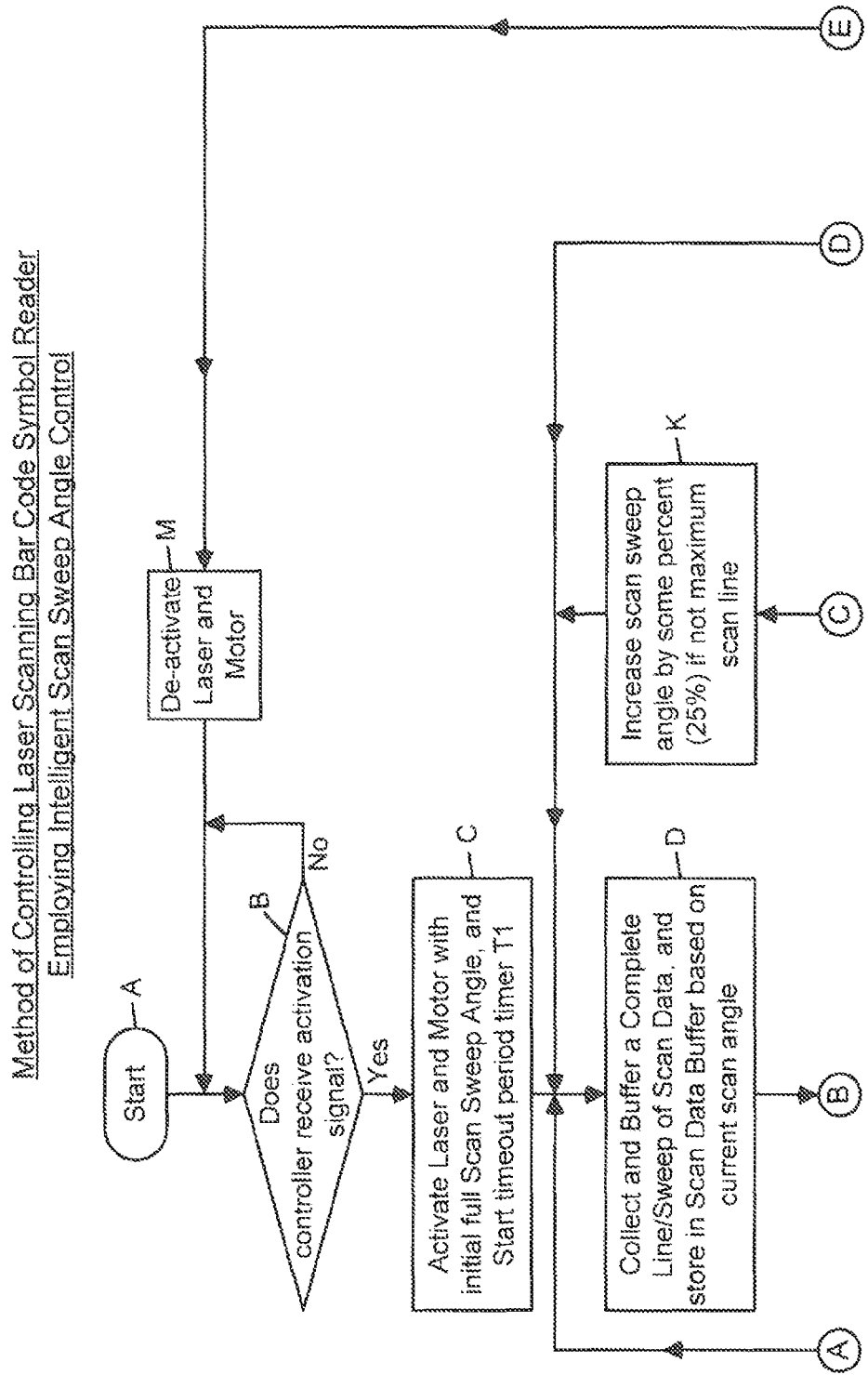

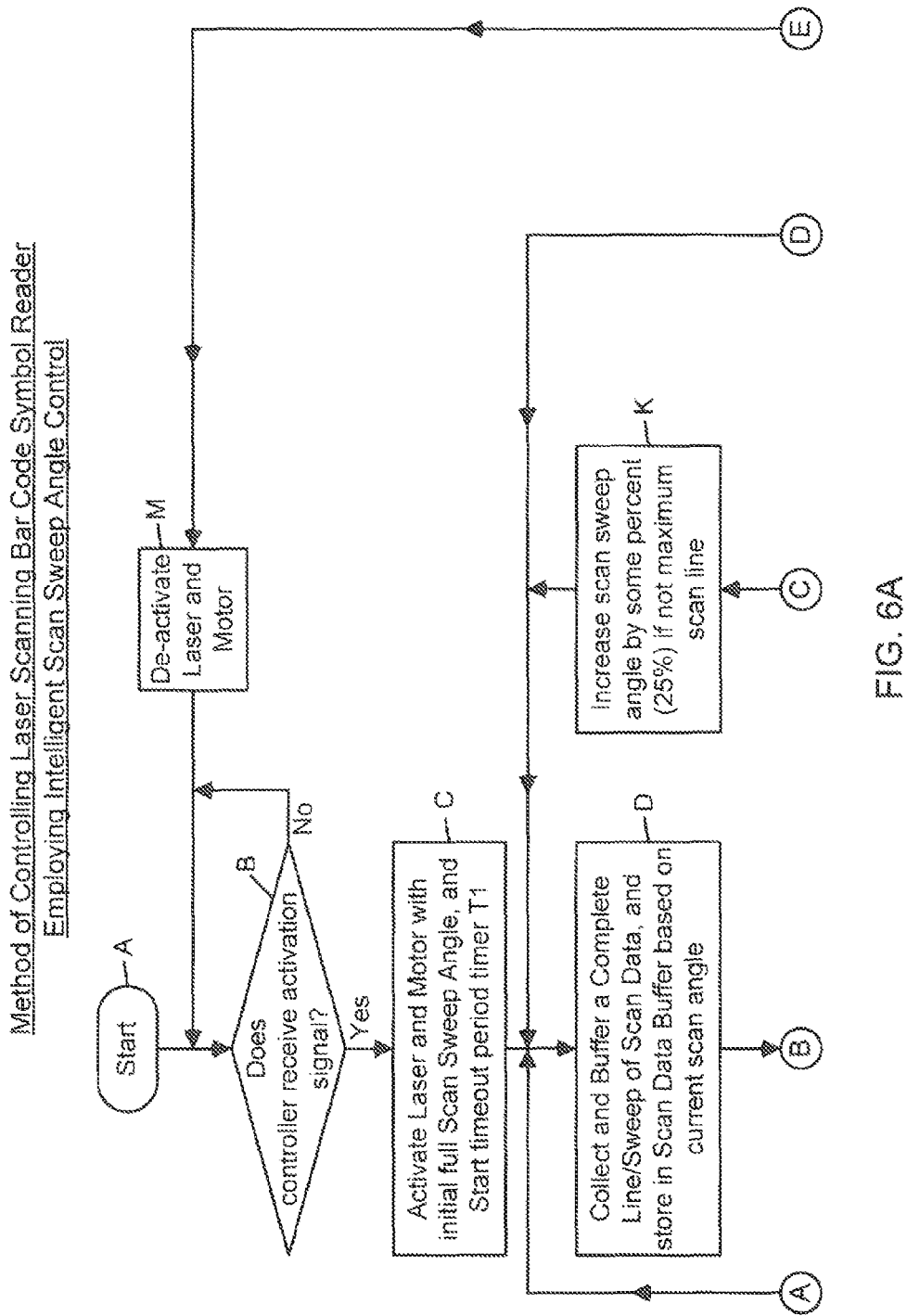

LASER SCANNING BAR CODE SYMBOL READING SYSTEM HAVING INTELLIGENT SCAN SWEEP ANGLE ADJUSTMENT CAPABILITIES OVER THE WORKING RANGE OF THE SYSTEM FOR OPTIMIZED BAR CODE SYMBOL READING PERFORMANCE

BACKGROUND

1. Field of Disclosure

The present disclosure relates to an improved method of and apparatus for laser scanning bar code symbols during bar code symbol reading operations.

2. Brief Overview of the State of the Art

In general, laser scanning devices have a nominal scan angle, which controls the length of the scan line along the depth of field of the laser scanner. Most laser scanning devices have only a single scan angle, which is satisfactory in applications characterized by a relatively small depth of field.

For laser scanners having a large depth of field, it is desirable to have multiple scan angles for several reasons. One reason is that a larger or smaller scan line can make scanning easier in certain applications. A second reason is that it is easier to see a smaller (or shorter) scanning beam, than a longer one, because a short scan line has a greater beam intensity than a long scan line. A third reason is that providing user control over the scan length of a laser scanning beam can assist in reading a selected bar code symbol among a menu of bar code symbols.

One technique for controlling the scan angle of a laser beam during scanner operation is disclosed in U.S. Pat. No. 5,250,791 to Frederic Heiman et al (assigned to Symbol Technologies, Inc.) involves using a microcontroller to modify a laser scanning beam (i.e. scan or sweep angles) during operation. This solution, while useful, requires configuration (i.e. setup) of the scanning device before operation, and maintenance of the configuration settings during the lifetime of the device.

Thus, there is a great need in the art for an improved method of controlling the scan sweep angle of the laser scanning beam during scanning operations, while avoiding the shortcomings and drawbacks of prior art methods and apparatus.

OBJECTS OF PRESENT DISCLOSURE

A primary object of the present disclosure is provide an improved method of and apparatus for laser scanning objects within the laser scanning field using a laser scanning beam having a beam (i.e. scan) sweep angle that is intelligently adjusted during the scanning process to optimize laser scanning performance.

Another object is to provide a novel method of reading bar code symbols using a laser scanning bar code symbol reading system having the capacity to automatically adjust the scan sweep angle of laser scanning beam, in response to the real-time processing of buffered lines of collected scan data collected from the laser scanning field, during each scanning cycle.

Another object is to provide a novel method of reading bar code symbols using a laser scanning bar code symbol reading system having the capacity to automatically adjust, each scanning cycle, the scan sweep angle of the laser scanning beam in response to processed scan data collected along the laser scanning field during laser scanning operations.

Another object is to provide a laser scanning system provided with the capacity to intelligently control the scan sweep angle of the laser scanning beam, during laser scanning operations, so as to optimize the scan line length of the laser beam required to read a single intended bar code symbol present in the laser scanning field.

Another object is to provide a laser scanning bar code symbol reading system, having intelligent scan sweep angle adjustment capabilities over the working range of the system for optimized bar code symbol reading performance.

Another object is to provide a novel a hand-supportable laser scanning bar code symbol reader that intelligently controls the scan sweep angle of the laser scanning beam during bar code scanning operations.

Another object is to provide a novel method of intelligently reducing or expanding the scan line length of a laser scanning beam across a scanning field, and further, to do so by analyzing a buffered line of scan data collected using a laser scanning beam having a given scan sweep angle, and determining whether the line of scan data represents one or more bar code symbol indications.

Another object is to provide a novel method of intelligently controlling the scan sweep angle of a laser scanning beam, by automatically searching for a bar code symbol indication (e.g. bar code symbol envelope) represented in the buffered line of scan data collected from the laser scanning field during each scanning cycle using the laser scanning beam operating at its adjustable scan sweep angle.

Another object is to provide a novel method of intelligently controlling the scan sweep angle of a laser scanning beam, wherein if no bar code symbol indications are found in the buffered line of scan data, or only an indication of a bar code symbol fragment has been found, then the scan sweep angle of the laser scanning beam is automatically increased and scanning operations resumed in effort to scan an entire bar code symbol in the scanning field.

Another object is to provide a novel method of intelligently controlling the scan sweep angle of a laser scanning beam, by automatically searching for a bar code symbol indication (e.g. bar code symbol envelope) represented in the buffered line of scan data collected from the current sweep of the laser scanning beam at the current scan sweep angle.

Another object is to provide a novel method of intelligently controlling the scan sweep angle of a laser scanning beam, wherein if two or more bar code symbol indications are represented in the buffered line of scan data, then the scan sweep angle of the laser scanning beam is automatically reduced so that the resulting laser scanning beam will be shortened and only a single bar code symbol will be scanned, most likely with the center portion of the laser scanning beam.

Another object is to provide a novel method of intelligently controlling the scan sweep angle of a laser scanning beam, in a way which is transparent and intuitive to the user, making it easy to control the scan sweep angle of the laser scanning beam so that only the desired bar code symbol being scanned is read by the bar code symbol reading system.

Further objects of the present disclosure will become more apparently understood hereinafter and in the Claims appended hereto.

BRIEF DESCRIPTION OF THE DRAWINGS

In order to more fully understand the Objects, the following Detailed Description of the Illustrative Embodiments should be read in conjunction with the accompanying Drawings, wherein:

FIGS. 3A and 3B set forth a flow chart describing the primary steps carried out in the laser scanning bar code symbol reading system of FIG. 1, while reading a bar code symbol present in its laser scanning field, wherein the scan sweep angle of the laser scanning beam is dynamically adjusted during laser scanning operations so that the scan line length of the laser beam is optimize to read only a single bar code symbol present in the laser scanning field, during a given scanning cycle;

FIGS. 6A and 6B set forth a flow chart describing the primary steps carried out in the automatically-triggered laser scanning bar code symbol reading system of FIG. 4, while reading a bar code symbol present in its laser scanning field, wherein the scan sweep angle of the laser scanning beam is dynamically adjusted during laser scanning operations so that the scan line length of the laser beam is optimize to read only a single bar code symbol present in the laser scanning field, during a given scanning cycle.

DETAILED DESCRIPTION OF THE ILLUSTRATIVE EMBODIMENTS

Figure 1:
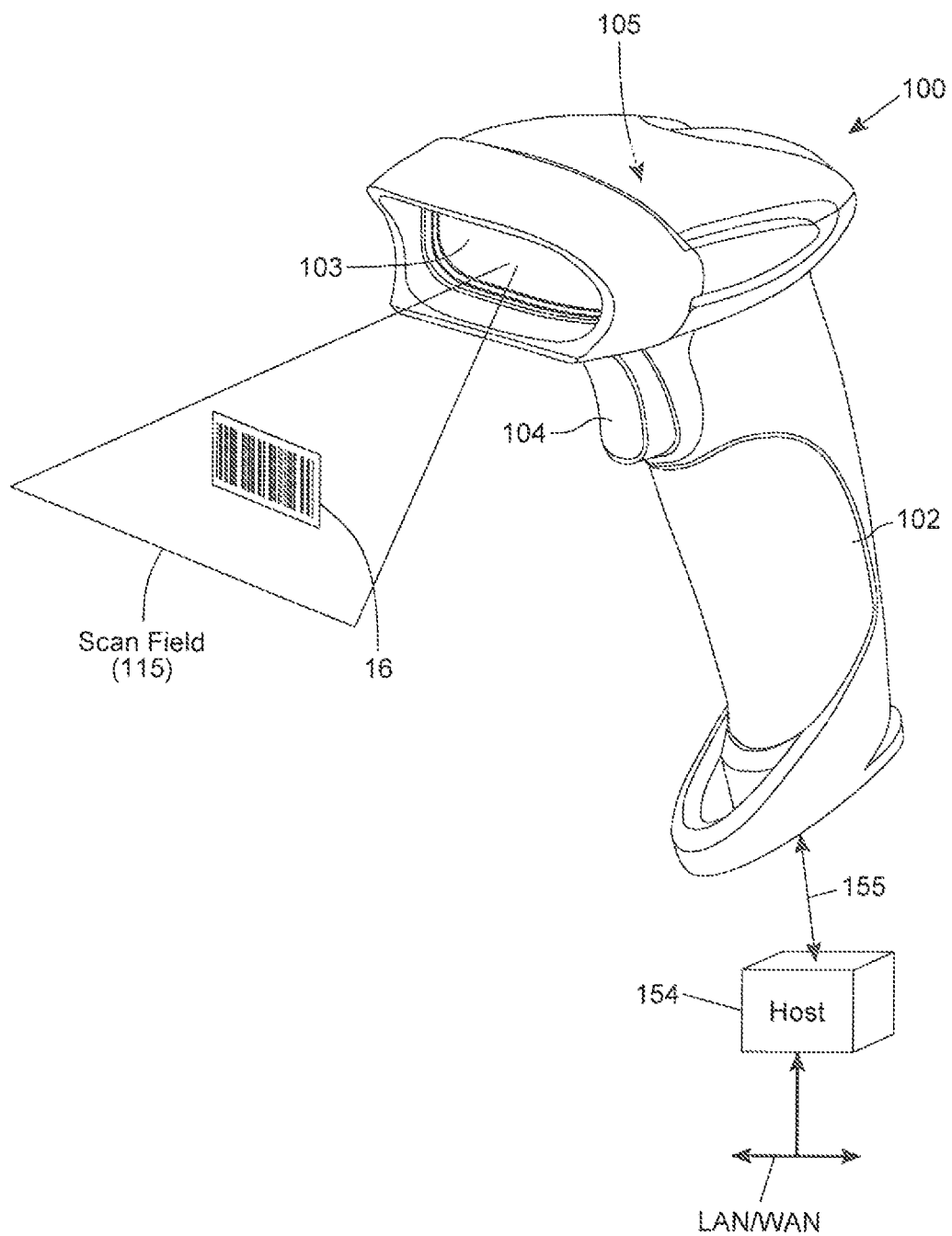
FIG. 1 is a perspective view of an illustrative embodiment of a manually-triggered hand-supportable laser scanning bar code symbol reading system, provided with the capacity to intelligently control the scan sweep angle of the laser scanning beam, during laser scanning operations, to optimize is scan line length of the laser beam required to read bar code symbol located in the scanning field along the working distance of system.

Referring to the figures in the accompanying Drawings, the illustrative embodiments of the dual laser-scanning bar code symbol reading system and will be described in great detail, wherein like elements will be indicated using like reference numerals.

Manually Triggered Hand-Supportable Laser Scanning Bar Code Symbol Reading System Having Intelligent Laser Scanning Beam Sweep Angle Control Referring now to FIGS. 1 through 3B, a first illustrative embodiment of a manually-triggered hand-supportable laser scanning bar code symbol reading system 1 will be described in detail.

Figure 2:
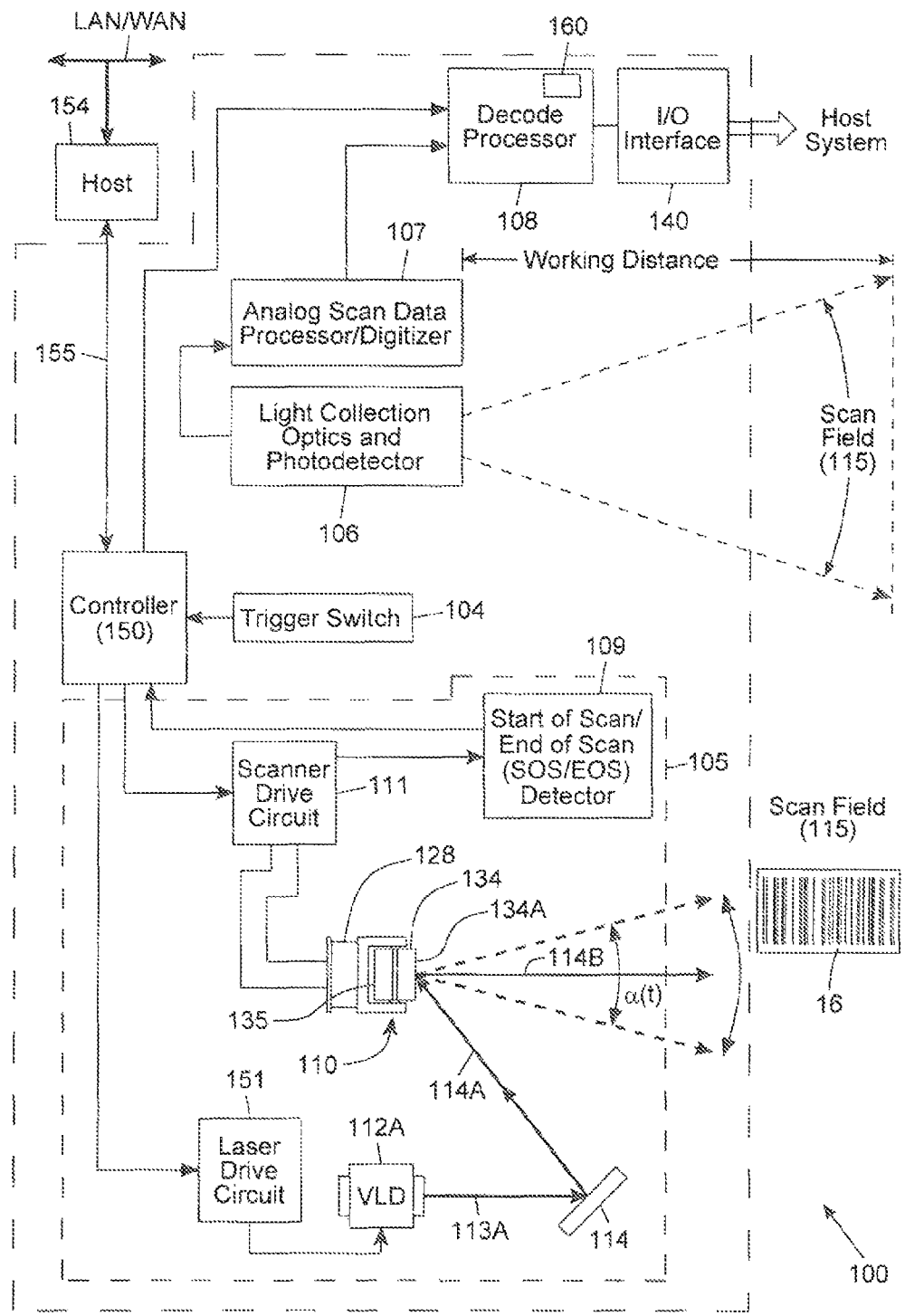
FIG. 2 is a schematic block diagram describing the major system components of the laser scanning bar code symbol reading system illustrated in FIG. 1.

As shown in FIGS. 1 and 2, the manually-triggered laser scanning bar code symbol reader 100 comprises: a hand-supportable housing 102 having a head portion and a handle portion supporting the head portion; a light transmission window 103 integrated with the head portion of the housing 102; a manually-actuated trigger switch 104 integrated with the handle portion of the housing, for activating its laser scanning module 105 with a laser scanning field 115; a laser scanning module 105, for repeatedly scanning, across the laser scanning field, a visible laser beam generated by a laser source 112 (e.g. VLD or IR LD) having optics to produce a laser scanning beam focused in the laser scanning field, in response to a control signal generated by a system controller 150; wherein the laser scanning module 105 also includes a laser drive circuit 151 for receiving control signals from system controller 150, and in response thereto, generating and delivering laser (diode) drive current signals to the laser source 112A; a start of scan/end of scan (SOS/EOS) detector 109, for generating timing signals indicating the start of laser beam sweep, and the end of each laser beam sweep, and sending these SOS/EOS timing signals to the system controller 150; light collection optics 106 for collecting light reflected/scattered from scanned object in the scanning field, and a photo-detector for detecting the intensity of collected light and generating an analog scan data signal corresponding to said detected light intensity during scanning operations; an analog scan data signal processor/digitizer 107 for processing the analog scan data signals and converting the processed analog scan data signals into digital scan data signals, which are then converted into digital words representative of the relative width of the bars and spaces in the scanned code symbol structure; a set of scan data buffers 160 for buffering each complete line of scan data collected during a complete sweep of the laser scanning beam across the laser scanning field during each scanning cycle (i.e. for both scanning directions); programmed decode processor 108 for decode processing digitized data stored in said scan data buffer 160, and generating symbol character data representative of each bar code symbol scanned by the laser scanning beam; an input/output (I/O) communication interface module 140 for interfacing with a host communication system 154 and transmitting symbol character data thereto via wired or wireless communication links 155 that are supported by the symbol reader and host system 154; and a system controller 150 for generating the necessary control signals for controlling operations within the hand-supportable laser scanning bar code symbol reading system.

As shown in FIG. 2, the laser scanning module 105 comprises a number of subcomponents, namely: laser scanning assembly 110 with an electromagnetic coil 128 and rotatable scanning element (e.g. mirror) 134 supporting a lightweight reflective element (e.g. mirror) 134A; a coil drive circuit 111 for generating an electrical drive signal to drive the electromagnetic coil 128 in the laser scanning assembly 110; and a laser beam source 112A for producing a visible laser beam 113A; and a beam deflecting mirror 114 for deflecting the laser beam 113A as incident beam 114A towards the mirror component of the laser scanning assembly 110, which sweeps the deflected laser beam 114B across the laser scanning field and a bar code symbol 16 that might be simultaneously present therein during system operation.

As shown in FIG. 2, the laser scanning module 105 is typically mounted on an optical bench, printed circuit (PC) board or other surface where the laser scanning assembly is also, and includes a coil support portion 110 for supporting the electromagnetic coil 128 (in the vicinity of the permanent magnet 135) and which is driven by a scanner drive circuit 111 so that it generates magnetic forces on opposite poles of the permanent magnet 135, during scanning assembly operation. Assuming the properties of the permanent magnet 135 are substantially constant, as well as the distance between the permanent magnet 135 and the electromagnetic coil 128, the force exerted on the permanent magnet 135 and its associated scanning element is a function of the electrical drive current supplied to the electromagnetic coil 128 during scanning operations. In general, the greater the level of drive current produced by scanner drive circuit 111, the greater the forces exerted on permanent magnet 135 and its associated scanning element, and in turn, the greater the resultant scan sweep angle $\alpha(t)$, and thus scan line length produced by the laser scanning beam. Thus, scan sweep angle $\alpha(t)$ of the scanning module 105 can be directly controlled by controlling the level of drive current supplied to the coil 128 by the scanner drive circuit 111. This will be the preferred method of controlling the scan sweep angle $\alpha(t)$ and scan line length in the present disclosure.

In general, system 100 supports a manually-triggered triggered mode of operation, and the bar code symbol reading method described below.

In response to a triggering event (i.e. manually pulling trigger 104), the laser scanning module 105 generates and projects a laser scanning beam through the light transmission window 103, and across the laser scanning field external to the hand-supportable housing, for scanning an object in the scanning field. The laser scanning beam is generated by the laser beam source 112A in response control signals generated by the system controller 150. The scanning element (i.e. mechanism) 134 repeatedly scans the selected laser beam across a code symbol residing on an object in the laser scanning field 115, at the scan sweep angle set by the controller 150 for the current scanning cycle, determined by the process described in FIGS. 3A and 3B. Then, the light collection optics 106 collects light reflected/scattered from scanned code symbols on the object in the scanning field, and the photo-detector (106) automatically detects the intensity of collected light (i.e. photonic energy) and generates an analog scan data signal corresponding to the light intensity detected during scanning operations. The analog scan data signal processor/digitizer 107 processes the analog scan data signals and converts the processed analog scan data signals into digitized data signals. The programmed decode processor 108 decode processes digitized data signals, and generates symbol character data representative of each bar code symbol scanned by the laser scanning beam. Symbol character data corresponding to the bar codes read by the decoder 108, are then transmitted to the host system 154 via the I/O communication interface 140, which may support either a wired and/or wireless communication link 155, well known in the art. During object detection and laser scanning operations, the system controller 150 generates the necessary control signals for controlling operations within the hand-supportable laser scanning bar code symbol reading system.

Figure 3B:
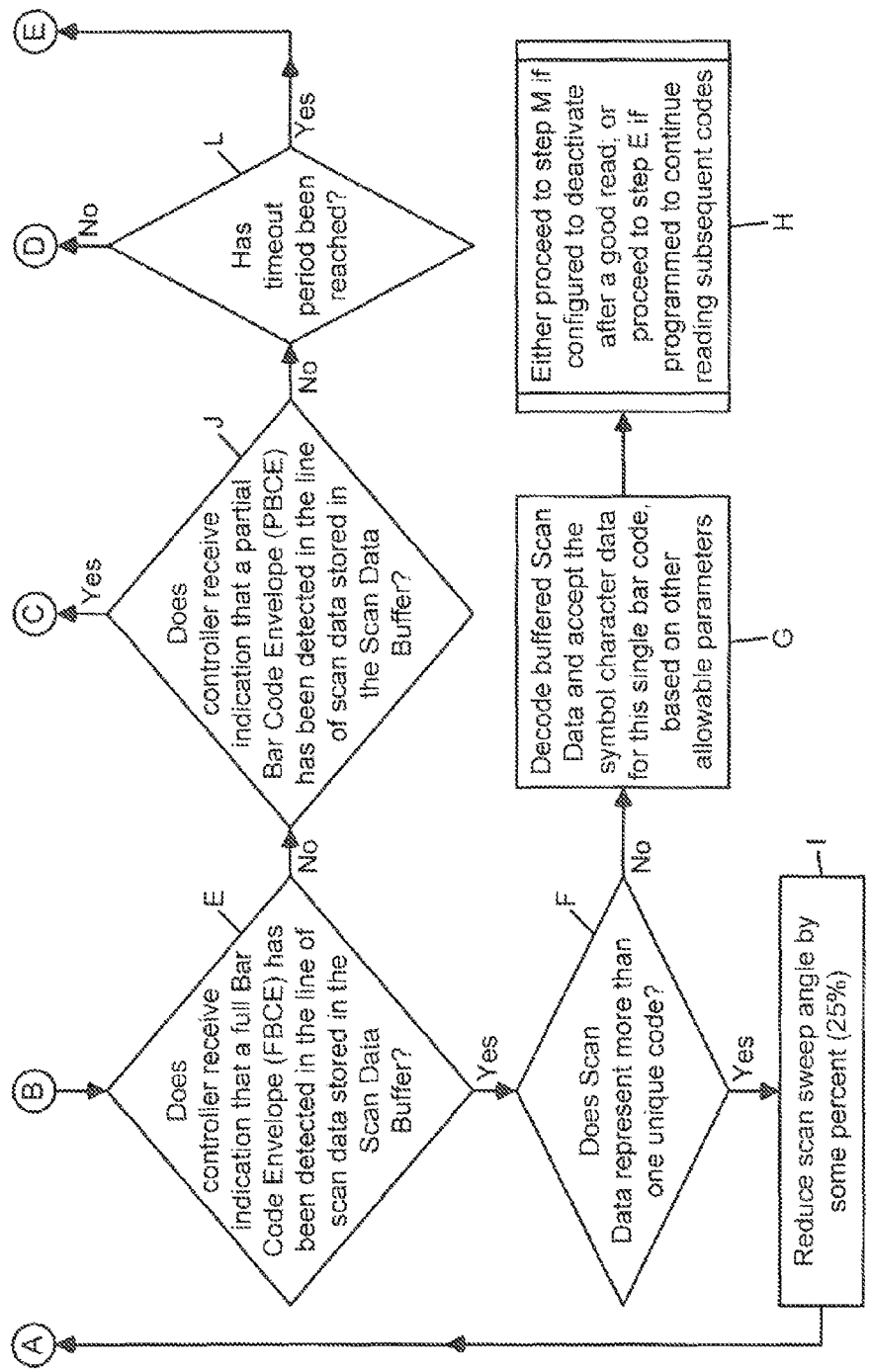

Referring to FIGS. 3A and 3B, the method of reading bar code symbols and controlling operations within the laser scanning bar code reader 100 will be described in greater detail.

As indicated in FIG. 3A, the process orchestrated by system controller 150 begins at the START Block, where all system components are activated except for the laser and scanning motor (i.e. electromagnetic coil). Then at Block B in FIG. 3A, the system controller determines if a trigger or activation event has occurred (i.e. trigger switch 104 has been manually depressed by the operator).

In the event that a trigger event has been detected at Block B, then the system controller proceeds to Block C and (i) activates the laser diode, and scanner drive circuit 111 with a sufficient current to generate a full initial default scan sweep angle $\alpha_o(t)$, and (ii) starts timeout period timer T1.

As indicated at Block D, the system controller commands the buffering, in the scan data buffer, a complete line of scan data collected during both scanning directions, over a full scan sweep angle set during the current scanning cycle. Scan data from each direction is monitored independently in the following process steps.

At Block E, the system controller determines whether it has received from decode processor 108, an indication that a complete bar code symbol has been detected or recognized (e.g. by detecting a full bar code symbol envelope (BCSE) or like structure) based on the line of scan collected at the current scan sweep angle, and buffered in the scan data buffer 160. A full BCSE can be detected in many possible ways using programmable decoder 108, including analyzing detected edge data, the duration between detected edges, and/or the strength of individual edges.

If, at Block E, a full bar code symbol indication (e.g. bar code symbol envelope) has been detected (or recognized) within the buffered line of scan data, then the system controller proceeds to Block F and determines whether or not the buffered line of scan data, represents more than one unique bar code symbol (i.e. either two or more BCSEs have been detected, or one full BCSE and a portion of one). If the system controller determines at Block F that more than one bar code symbol is represented in the buffered line of scan data, this indicates that the scan line length at the scanning plane was too long and should be reduced in length, by reducing the scan sweep angle. So at Block I, the system controller reduces the scan sweep angle by a predetermined increment $+\Delta\alpha$ (e.g. 25%), and returns to Block D, where another complete line or sweep of scan data is collected from the scanned object, and buffered in the scan data buffer 160 maintained by the decode processor 108, and then the control flow resumes.

If at Block F, the buffered line of scan data represents only one bar code symbol, then the system controller proceeds to Block G and decode processes the buffered scan data and accepts a single bar code symbol for the processed scan data set, based on allowable parameters (e.g. number of characters, and other decode security settings). Then at Block H, the system controller proceeds to step M in the event that the system has been configured to deactivate after completing a good symbol read; or proceeds to step E in the event that the system has been programmed to continue reading subsequent bar code symbols, as the case may be.

If at Block E, the system controller does not receive from the decode process, an indication that a full bar code symbol indication (i.e. bar code symbol envelope (BCSE)) has been recognized or detected, then at Block J the system controller determines whether or not it has receives an indication that a partial BSCE has been detected, and if so, the system controller proceeds to Block K and increases the scan sweep angle by a predetermined decrement $-\Delta\alpha$ (e.g. 25%) provided that the maximum scan angle, i.e. maximum scan line, has been reached by the system, and then returns to Block D, and resumes the control flow specified in FIG. 3A. For some symbologies (e.g. 9 of 12), it may be possible to have a smart angle adjustment in place of a predetermined amount.

If, at Block J, the system controller does not receive a partial bar code symbol indication (e.g. partial BCSE or like representation) from the decode processor 108, then the system controller proceeds to Block L at determines whether or not the timeout time T1 has been reached. If not, then the system controller proceeds to Block E and resumes operations specified in the flow chart. However, if the timeout time T1 has not been reached at Block L, then the system controller proceeds to Block M, where the system controller deactivates the laser diode and scanning motor, and returns to Block B, looking for a new triggering/activation signal.

By virtue of the novel control process described in FIGS. 3A and 3B, the manually-triggered bar code symbol reader has the capacity to intelligently control the scan sweep angle of the laser scanning beam, during laser scanning operations, to optimize the scan line length of the laser beam required to read the bar code symbol present in the laser scanning field. Automatically-Triggered Hand-Supportable Laser Scanning System Having Intelligent Laser Scanning Beam Sweep Angle Control Referring to FIGS. 4 through 6B, a second illustrative embodiment of an automatically-triggered hand-supportable laser scanning bar code symbol reading system 500 will be described in detail.

Referring now to FIGS. 4 through 6B, a second illustrative embodiment of an automatically-triggered hand-supportable laser scanning bar code symbol reading system 1 will be described in detail.

Figure 4:
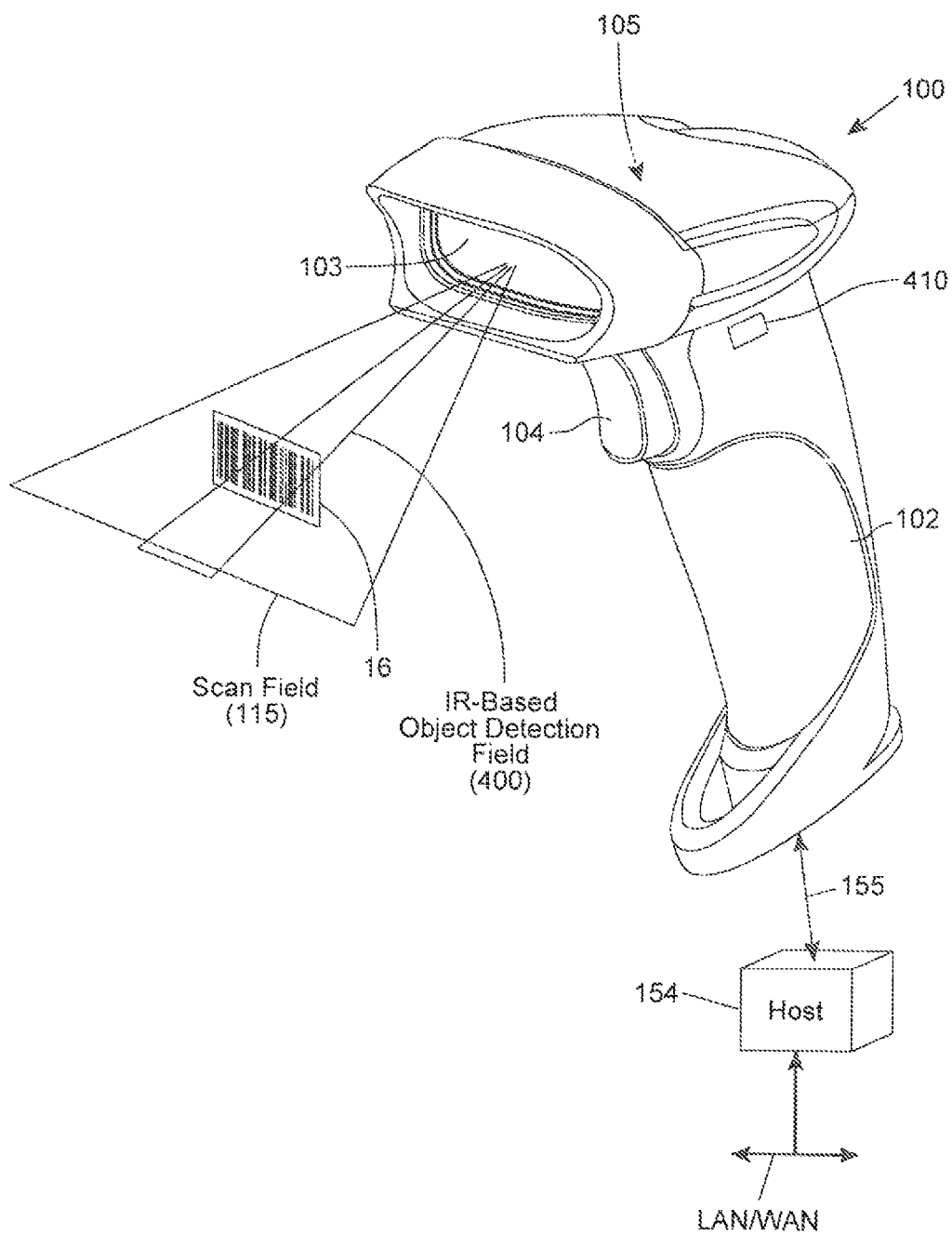
FIG. 4 is a perspective view of an illustrative embodiment of an automatically-triggered hand-supportable laser scanning bar code symbol reading system, provided with the capacity to intelligently control the scan sweep angle of the laser scanning beam, during laser scanning operations, to optimize is scan line length of the laser beam required to read the bar code symbol present in the laser scanning field.
Figure 5:
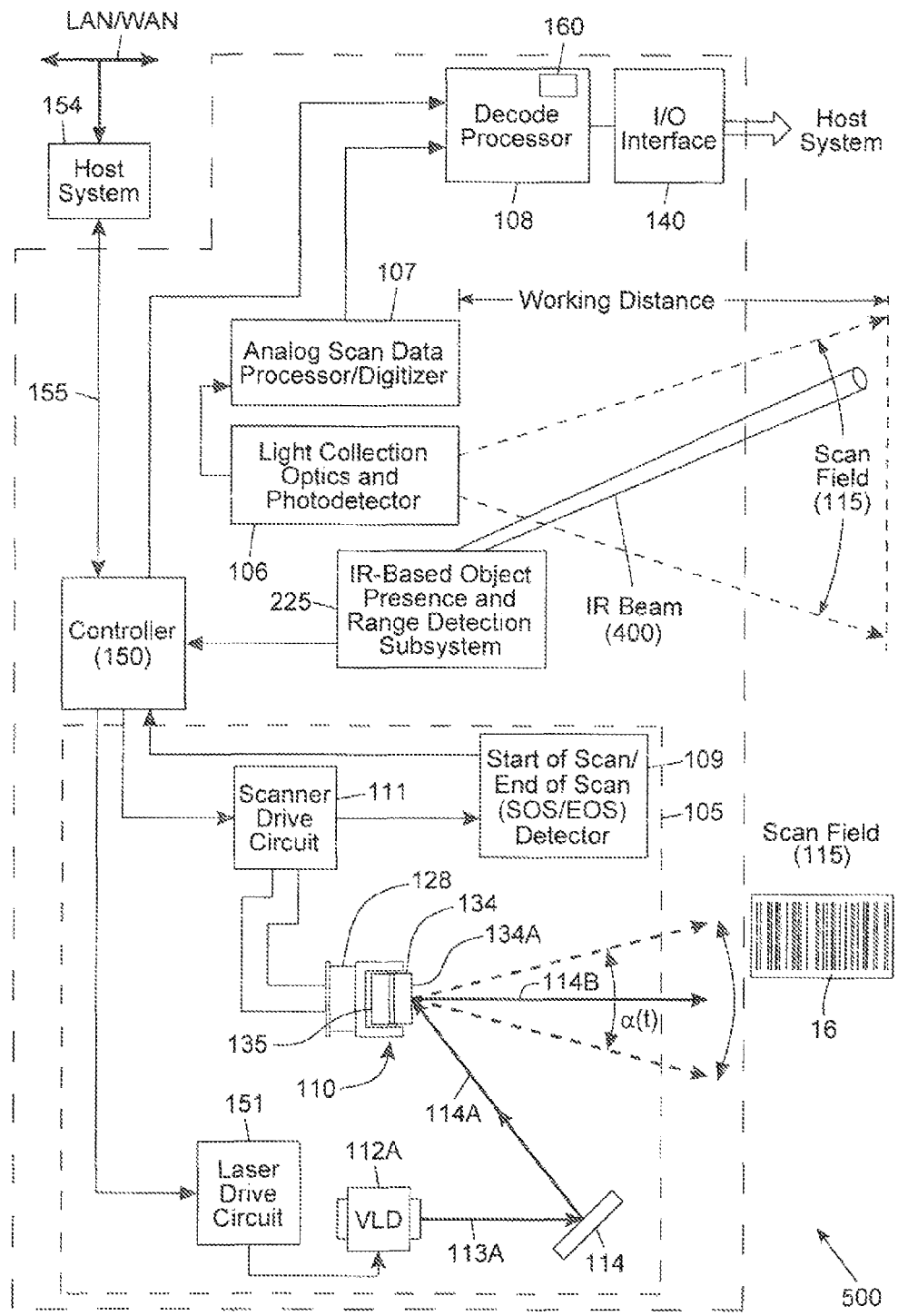
FIG. 5 is a schematic block diagram describing the major system components of the automatically-triggered laser scanning bar code symbol reading system illustrated in FIG. 4.
Figure 6B:
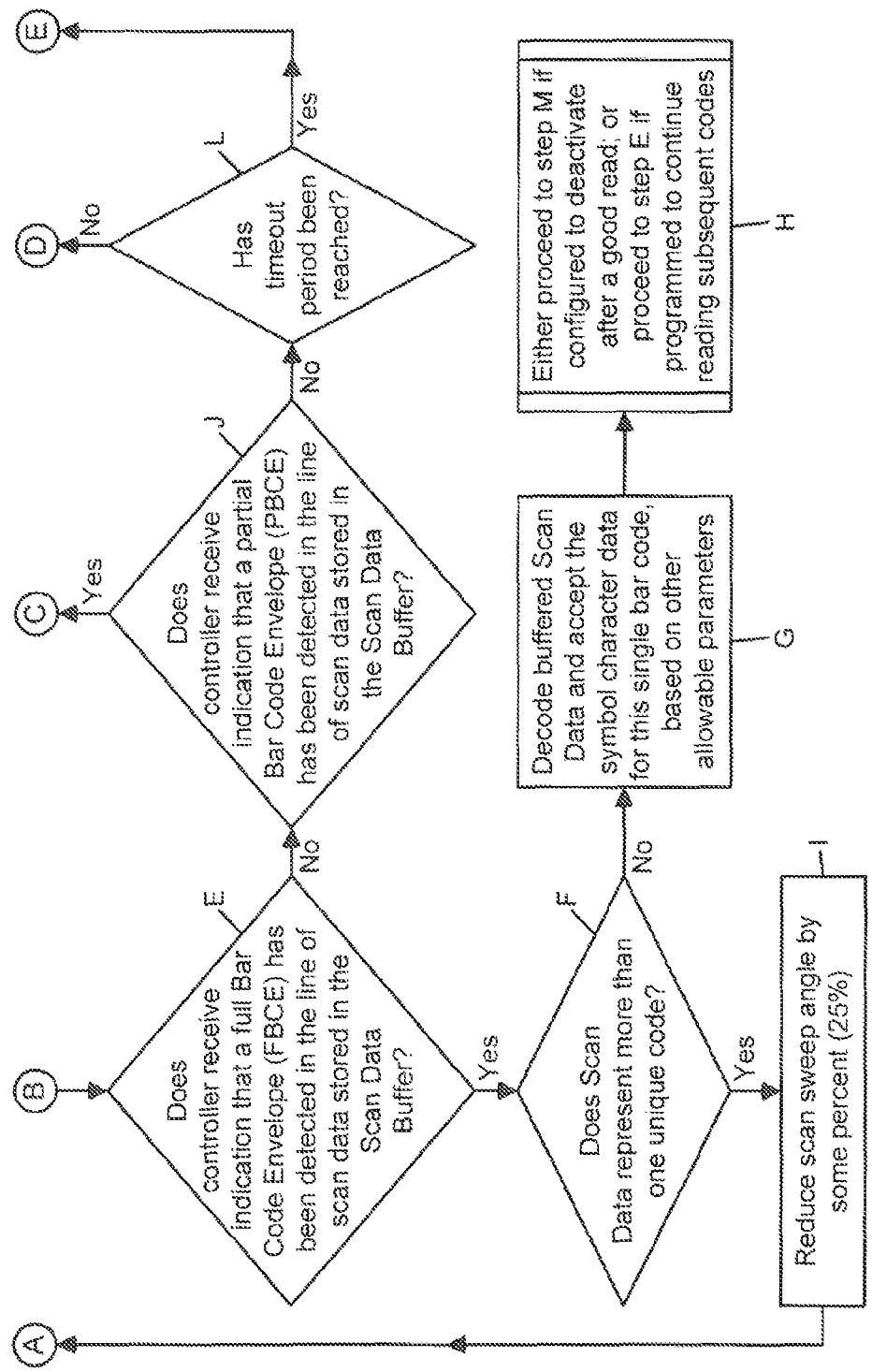

As shown in FIGS. 4 and 5, the manually-triggered laser scanning bar code symbol reader 500 comprises: a hand-supportable housing 102 having a bead portion and a handle portion supporting the head portion; a light transmission window 103 integrated with the head portion of the housing 102; a IR or LED based object detection subsystem 225 disposed in with the head portion of the housing, for generating and IR or LED beam within the laser scanning field, as shown in FIG. 5, for automatically detecting whether or not an object is present in the laser scanning field, and if so, then automatically activating (i.e. triggering) the system including laser scanning module 105 to carrying out laser scan data capture and processing operations; a laser scanning module 105, for repeatedly scanning, across the laser scanning field, a visible laser beam generated by a laser source 112A (e.g. VLD or IR LD) having optics to produce a laser scanning beam focused in the laser scanning field, in response to a control signal generated by a system controller 150; wherein the laser scanning module 105 also includes a laser drive circuit 151 for receiving control signals from system controller 150, and in response thereto, generating and delivering laser (diode) drive current signals to the laser source 112A to produce laser scanning beam during the method of bar code symbol reading described in FIGS. 6A and 6B; a start of scan/end of scan (SOS/EOS) detector 109, for generating timing signals indicating the start of laser beam sweep, and the end of each laser beam sweep, and sending these SOS/EOS timing signals to the system controller 150; light collection optics 106 for collecting light reflected/scattered from scanned object in the scanning field, and a photo-detector for detecting the intensity of collected light and generating an analog scan data signal corresponding to said detected light intensity during scanning operations; an analog scan data signal processor/digitizer 107 for processing the analog scan data signals and converting the processed analog scan data signals into digital scan data signals, which are then converted into digital words representative of the relative width of the bars and spaces in the scanned code symbol structure; a set of scan data buffers 160 for buffering each complete line of scan data collected during a complete sweep of the laser scanning beam across the laser scanning field during each scanning cycle (i.e. for both scanning directions); programmed decode processor 108 for decode processing digitized data stored in scan data buffer 160, and generating symbol character data representative of each bar code symbol scanned by the visible laser scanning beam; an input/output (I/O) communication interface module 140 for interfacing with a host communication system 154 and transmitting symbol character data thereto via wired or wireless communication links 155 that are supported by the symbol reader and host system 154; and a system controller 150 for generating the necessary control signals for controlling operations within the hand-supportable laser scanning bar code symbol reading system.

Preferably, IR-based object detection subsystem 225 is mounted in the front of its light transmission window so that the IR (or LED) light transmitter and IR (or LED) light receiver of subsystem 225 have an unobstructed view of an object within the laser scanning field of the system. Also, IR (or LED) object presence detection module 225 can transmit IR (or LED) signals having a continuous low-intensity output level, or having pulsed higher-intensity output level which may be used under some conditions to increase the object detection range of the system. In alternative embodiments, the IR light transmitter and IR light receiver components can be realized as visible light (e.g. red light) transmitter and visible light (e.g. red light) receiver components, respectively, implemented using LED technology, well known in the art. Typically the object detecting light beam will be modulated and synchronously detected, as taught in U.S. Pat. No. 5,340,971, incorporated herein by reference.

As shown in FIG. 5, the laser scanning module 105 comprises a number of subcomponents, namely: laser scanning assembly 110 with an electromagnetic coil 128 and rotatable or oscillating scanning element 134 supporting a lightweight reflective element; a scanner coil drive circuit 111 for generating an electrical drive signal to drive the electromagnetic coil 128 in the laser scanning assembly 110; and a laser beam source 112A for producing a visible laser beam 113A; and a beam deflecting mirror 114 for deflecting the laser beam 113A from laser beam source 112A, towards the mirror component 134A of the laser scanning assembly 110, which sweeps the laser beam 114B across the scan field and one or more bar code symbols 16 that might be simultaneously present therein during system operation.

As shown in FIG. 5, the laser scanning module 105 is typically mounted on an optical bench, printed circuit (PC) board or other surface where the laser scanning assembly is also, and includes a coil support portion 110 for supporting the electromagnetic coil 128 (in the vicinity of the permanent magnet 135) and which is driven by a scanner drive circuit 111 so that it generates magnetic forces on opposite poles of the permanent magnet 135, causing mirror component 134 to oscillate about its axis of rotation, during scanning assembly operation. Assuming the properties of the permanent magnet 135 are substantially constant, as well as the distance between the permanent magnet 135 and the electromagnetic coil 128, the force exerted on the permanent magnet 135 and its associated scanning element is a function of the electrical drive current supplied to the electromagnetic coil 128 during scanning operations. In general, the greater the level of drive current produced by scanner drive circuit 111, the greater the forces exerted on permanent magnet 135 and its associated scanning element, and in turn, the greater the resultant scan sweep angle $\alpha(t)$, and thus scan line length produced by the laser scanning beam. Thus, scan sweep angle $\alpha(t)$ of the scanning module 105 can be directly controlled by controlling the level of drive current supplied to the coil 128 by the scanner drive circuit 111. This will be the preferred method of controlling the scan sweep angle $\alpha(t)$ and scan line length in the present disclosure.

In general, system 500 supports an automatically-triggered mode of operation, and a bar code symbol reading method described below.

In response to the automatic detection of an object in the laser scanning field 115, by IR or LED based object presence detection subsystem 225, the laser scanning module 105 generates and projects a laser scanning beam through the light transmission window 103, and across the laser scanning field 115 external to the hand-supportable housing, for scanning an object in the scanning field. The laser scanning beam is generated by the laser source 112B in response control signals generated by the system controller 150. The scanning element (i.e. mechanism) 134 repeatedly scans the laser beam across the object in the laser scanning field, at the scan sweep angle set by the controller 150 for the current scanning cycle, determined by the process described in FIGS. 3A and 3B. Then, the light collection optics 106 collects light reflected/scattered from scanned code symbols on the object in the scanning field, and the photo-detector (106) automatically detects the intensity of collected light (i.e. photonic energy) and generates an analog scan data signal corresponding to the light intensity detected during scanning operations. The analog scan data signal processor/digitizer 107 processes the analog scan data signals and converts the processed analog scan data signals into digitized data signals. The programmed decode processor 108 decode processes digitized data signals, and generates symbol character data representative of each bar code symbol scanned by either a visible or invisible laser scanning beam. Symbol character data corresponding to the visible and/or invisible bar codes read by the decoder 108, are then transmitted to the host system 154 via the I/O communication interface 140 which may support either a wired and/or wireless communication link 155, well known in the art. During object detection and laser scanning operations, the system controller 150 generates the necessary control signals for controlling operations within the hand-supportable laser scanning bar code symbol reading system 500.

Referring to FIGS. 6A and 6B, the method of reading bar code symbols and controlling operations within the laser scanning bar code reader 500 will be described in greater detail below.

As indicated in FIG. 6A, the process orchestrated by system controller 150 begins at the START Block, where all system components are activated except for the laser and scanning motor (i.e. electromagnetic coil). Then at Block B in FIG. 6A, the system controller determines whether or not a trigger event (i.e. activation event) has occurred (i.e. whether or not IR or LED based object detection circuit 225 has detected an object in the laser scanning field).

In the event that a trigger event has been detected at Block B, then the system controller proceeds to Block C and (i) activates the laser diode, and scanner drive circuit 111 with a sufficient current to generate a full initial default scan sweep angle $\alpha_o(t)$, and (ii) starts timeout period timer T1. In the event that a trigger event has been detected at Block B, then the system controller proceeds to Block C and (i) activates the laser diode, and scanner drive circuit 111 with a sufficient current to generate a full initial default scan sweep angle $\alpha_o(t)$, and (ii) starts timeout period timer T1.

As indicated at Block D, the system controller commands the buffering, in the scan data buffer, a complete line of scan data collected during both scanning directions, over a full scan sweep angle set during the current scanning cycle.

At Block E, the system controller determines whether it has received from decode processor 108, an indication that a complete bar code symbol has been detected or recognized (e.g. by detecting a full bar code symbol envelope (BCSE) or like structure) based on the line of scan collected at the current scan sweep angle, and buffered in the scan data buffer 160. A full BCSE can be detected in many possible ways using programmable decoder 108, including analyzing detected edge data, the duration between detected edges, and/or the strength of individual edges.

If, at Block E, a full bar code symbol indication (e.g. bar code symbol envelope) has been detected (or recognized) within the buffered line of scan data, then the system controller proceeds to Block F and determines whether or not the buffered line of scan data, represents more than one unique bar code symbol (i.e. either two or more BCSEs have been detected, or one full BCSE and a portion of one). If the system controller determines at Block F that more than one bar code symbol is represented in the buffered line of scan data, this indicates that the scan line length at the scanning plane was too long and should be reduced in length, by reducing the scan sweep angle. So at Block I, the system controller reduces the scan sweep angle by a predetermined increment $\alpha(t)$ (e.g. 25%), and returns to Block D, where another complete line or sweep of scan data is collected from the scanned object, and buffered in the scan data buffer 160 maintained by the decode processor 108, and then the control flow resumes.

If at Block F, the buffered line of scan data represents only one bar code symbol, then the system controller proceeds to Block G and decode processes the buffered scan data and accepts a single bar code symbol for the processed scan data set, based on allowable parameters (e.g. symbology, symbol length, etc) Then at Block H, the system controller proceeds to step M in the event that the system has been configured to deactivate after completing a good symbol read; or proceeds to step E in the event that the system has been programmed to continue reading subsequent bar code symbols, as the case may be.

If at Block E, the system controller does not receive from the decode process, an indication that a full bar code symbol indication (i.e. bar code symbol envelope (BCSE)) has been recognized or detected, then at Block J the system controller determines whether or not it has receives an indication that a partial BSCE has been detected, and if so, the system controller proceeds to Block K and increases the scan sweep angle by a predetermined decrement $-\Delta\alpha$ (e.g. 25%) provided that the maximum scan angle, i.e. maximum scan line, has been reached by the system, and then returns to Block D, and resumes the control flow specified in FIG. 6A.

If, at Block J, the system controller does not receive a partial bar code symbol indication (e.g. partial BCSE or like representation) from the decode processor 108, then the system controller proceeds to Block L at determines whether or not the timeout time T1 has been reached. If not, then the system controller proceeds to Block E and resumes operations specified in the flow chart. However, if the timeout time T1 has not been reached at Block L, then the system controller proceeds to Block M, where the system controller deactivates the laser diode and scanning motor, and returns to Block B, looking for a new triggering/activation signal.

By virtue of the novel control process described in FIGS. 6A and 6B, the manually-triggered bar code symbol reader has the capacity to intelligently control the scan sweep angle of the laser scanning beam, during laser scanning operations, to optimize the scan line length of the laser beam required to read the bar code symbol present in the laser scanning field.

Some Modifications which Readily Come to Mind

While the illustrative embodiments disclosed the use of a 1D laser scanning module to detect scan visible and/or invisible bar code symbols on objects, it is understood that a 2D or raster-type laser scanning module can be used as well, to scan 1D bar code symbols, 2D stacked linear bar code symbols, and 2D matrix code symbols, and generate scan data for decoding processing.

While hand-supportable laser scanning systems have been illustrated, it is understood that these laser scanning systems can be packaged in a portable or mobile data terminal (PDT) where the laser scanning engine begins to scan in response to receiving a request to scan from the host computer 154 within the PDT. Also, the laser scanning system can be integrated into modular compact housings and mounted in fixed application environments, such as on counter-top surfaces, on wall surfaces, and on transportable machines such as forklifts, where there is a need to scan code symbols on objects (e.g. boxes) that might be located anywhere within a large scanning range (e.g. up to 20+ feet away from the scanning system). In such fixed mounted applications, the trigger signal can be generated by manual switches located a remote locations (e.g. within the forklift cab near the driver) or anywhere not located on the housing of the system.

Also, the illustrative embodiment have been described in connection with various types of code symbol reading applications involving 1-D and 2-D bar code structures (e.g. 1D bar code symbols, 2D stacked linear bar code symbols, and 2D matrix code symbols), it is understood that the present invention can be used to read (i.e. recognize) any machine-readable indicia, dataform, or graphically-encoded form of intelligence, including, but not limited to bar code symbol structures, alphanumeric character recognition strings, handwriting, and diverse dataforms currently known in the art or to be developed in the future. Hereinafter, the term "code symbol" shall be deemed to include all such information carrying structures and other forms of graphically-encoded intelligence.

It is understood that the digital-imaging based bar code symbol reading system of the illustrative embodiments may be modified in a variety of ways which will become readily apparent to those skilled in the art of having the benefit of the novel teachings disclosed herein. All such modifications and variations of the illustrative embodiments thereof shall be deemed to be within the scope of the Claims appended hereto.

What is claimed is:

1. A method of reading symbols using a laser scanning beam comprising the steps of:
   generating a laser scanning beam having a scan sweep angle over a laser scanning field, the scan sweep angle defining a scan line's length during each scanning cycle;
   collecting a line of scan data from said laser scanning field during each scanning cycle, and buffering said line of scan data in a scan data buffer;
   processing said line of scan data in said scan data buffer during each scanning cycle to identify any symbols represented in said line of scan data;
   automatically adjusting the scan sweep angle of said laser scanning beam in response to said processing of said line of scan data; and
   if two or more symbols are represented in said processed line of scan data buffered in said scan data buffer, reducing the scan sweep angle of said laser scanning beam.

2. A method of intelligently reducing or expanding the scan line length of a laser scanning beam across a laser scanning field, said method comprising the steps of:
   generating a laser scanning beam having a scan sweep angle over a laser scanning field, the scan sweep angle defining a scan line's length during each scanning cycle;
   automatically scanning objects in said laser scanning field using said laser scanning beam;
   collecting a line of scan data from said laser scanning field during each scanning cycle, and buffering said line of scan data in a scan data buffer;
   processing said line of scan data in said scan data buffer during each scanning cycle to identify any symbols represented in said line of scan data;
   automatically reducing or expanding the scan sweep angle of said laser scanning beam in response to said processing of said line of scan data; and
   if two or more symbols are represented in said processed line of scan data buffered in said scan data buffer, reducing the scan sweep angle of said laser scanning beam.

3. The method of claim 2, wherein the step of processing said line of scan data in said scan data buffer comprises automatically searching for a bar code symbol envelope represented in the line of scan data in said scan data buffer.

4. The method of claim 3, wherein, during the step of processing said line of scan data in said scan data buffer, if no symbols are found in said line of scan data buffered in said scan data buffer, or if only an indication of a symbol fragment has been found, then the scan sweep angle of said laser scanning beam is automatically increased and scanning operations resumed in effort to scan an entire symbol in said laser scanning field.

5. The method of claim 3, wherein, during the step of processing said line of scan data in said scan data buffer, if two or more symbols are represented in said line of scan data buffered in said scan data buffer, then the scan sweep angle of said laser scanning beam is automatically reduced so that the resulting laser scanning beam will be shortened and only a single symbol will be scanned.

6. The method of claim 2, comprising, after the step of processing said line of scan data in said scan data buffer, transmitting an identified symbol to a host system.

7. The method of claim 2, wherein, during the step of processing said line of scan data in said scan data buffer, if a full symbol and a symbol fragment are represented in said line of scan data buffered in said scan data buffer, then identifying the full symbol and transmitting the identified full symbol to a host system.

8. The method of claim 1, comprising automatically reducing the scan sweep angle of said laser scanning beam in response to said processing of said line of scan data.

9. The method of claim 1, comprising automatically expanding the scan sweep angle of said laser scanning beam in response to said processing of said line of scan data.

10. The method of claim 1, wherein, during the step of processing said line of scan data in said scan data buffer, if no symbols are found in said line of scan data buffered in said scan data buffer, or if only a symbol fragment has been found, then the scan sweep angle of said laser scanning beam is automatically increased and scanning operations resumed in effort to scan a symbol in said laser scanning field.

11. The method of claim 1, wherein, during the step of processing said line of scan data in said scan data buffer, if two or more symbols are represented in said line of scan data buffered in said scan data buffer, then the scan sweep angle of said laser scanning beam is automatically reduced so that the resulting laser scanning beam will be shortened and only a single symbol will be scanned.

12. The method of claim 1, wherein, after the step of processing said line of scan data in said scan data buffer, transmitting an identified symbol to a host system.

13. The method of claim 1, wherein, during the step of processing said line of scan data in said scan data buffer, if a full symbol and a symbol fragment are represented in said line of scan data buffered in said scan data buffer, then identifying the full symbol and transmitting the identified full symbol to a host system.

14. A method of reading symbols, comprising:
   generating a scanning beam having a sweep angle over a scanning field, the sweep angle defining a scan line's length during each scanning cycle;
   collecting a line of scan data from the scanning field during each scanning cycle;

processing the line of scan data during each scanning cycle to identify any symbols represented in the line of scan data;

automatically adjusting the sweep angle of the scanning beam in response to the processing of the line of scan data; and if the step of processing the line of scan data identifies two or more symbols in the processed line of scan data, reducing the scanning beam's sweep angle.

15. The method of claim 14, wherein, if the step of processing the line of scan data does not identify a symbol in the line of scan data, the scanning beam's sweep angle is expanded.

16. The method of claim 14, wherein, if the step of processing the line of scan data identifies only a symbol fragment in the line of scan data, the scanning beam's sweep angle is expanded.

17. The method of claim 14, wherein, if the step of processing the line of scan data identifies a full symbol and a symbol fragment in the line of scan data, the scanning beam's sweep angle is reduced so that the resulting laser scanning beam will be shortened and only a single symbol will be scanned.

18. The method of claim 14, wherein, if the step of processing the line of scan data identifies two or more symbols in the line of scan data, the scanning beam's sweep angle is reduced.

19. The method of claim 14, comprising, if the step of processing the line of scan data identifies a full symbol and a symbol fragment in the line of scan data, transmitting the identified full symbol.

20. The method of claim 14, comprising, after the step of processing the line of scan data, transmitting an identified symbol to a host system.

* * * * *